E. H. FRANCE.
DIRECTION INDICATING APPARATUS FOR MOTOR VEHICLES.
APPLICATION FILED MAR. 25, 1916.
1,222,379.
Patented Apr. 10, 1917.
2 SHEETS—SHEET 1.
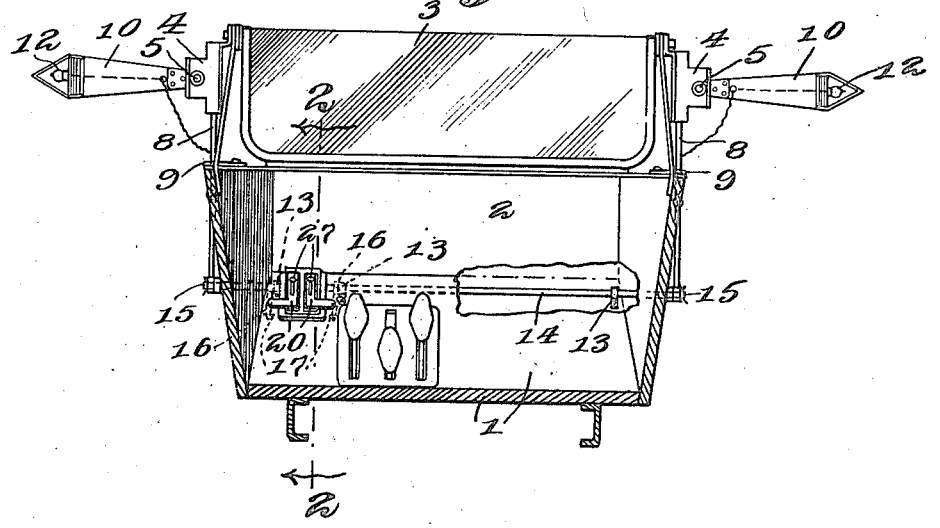
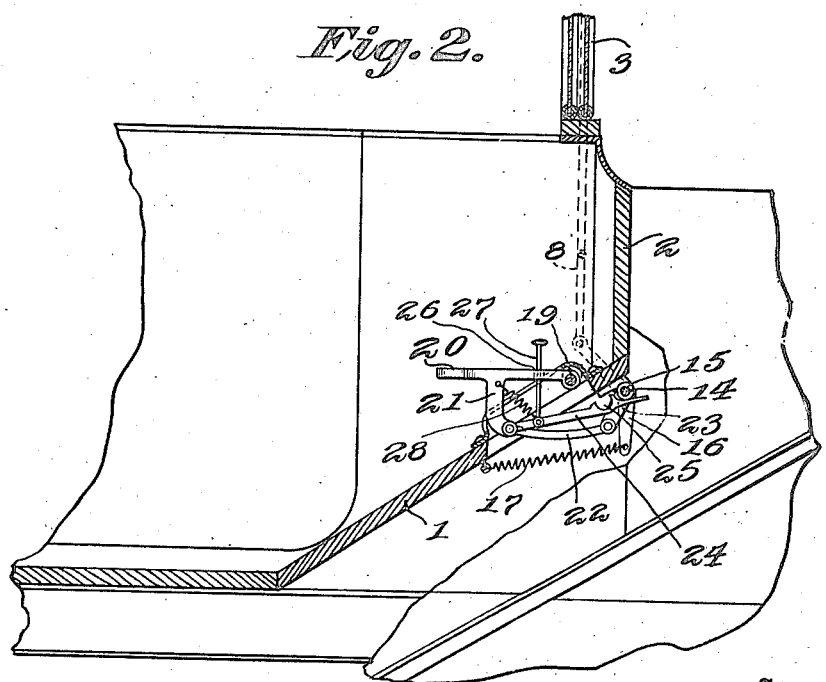
Witnesses
H. H. Lybrand
J. J. McCarty
Inventor
Ervine H. France
By Victor J. Evans
Attorney

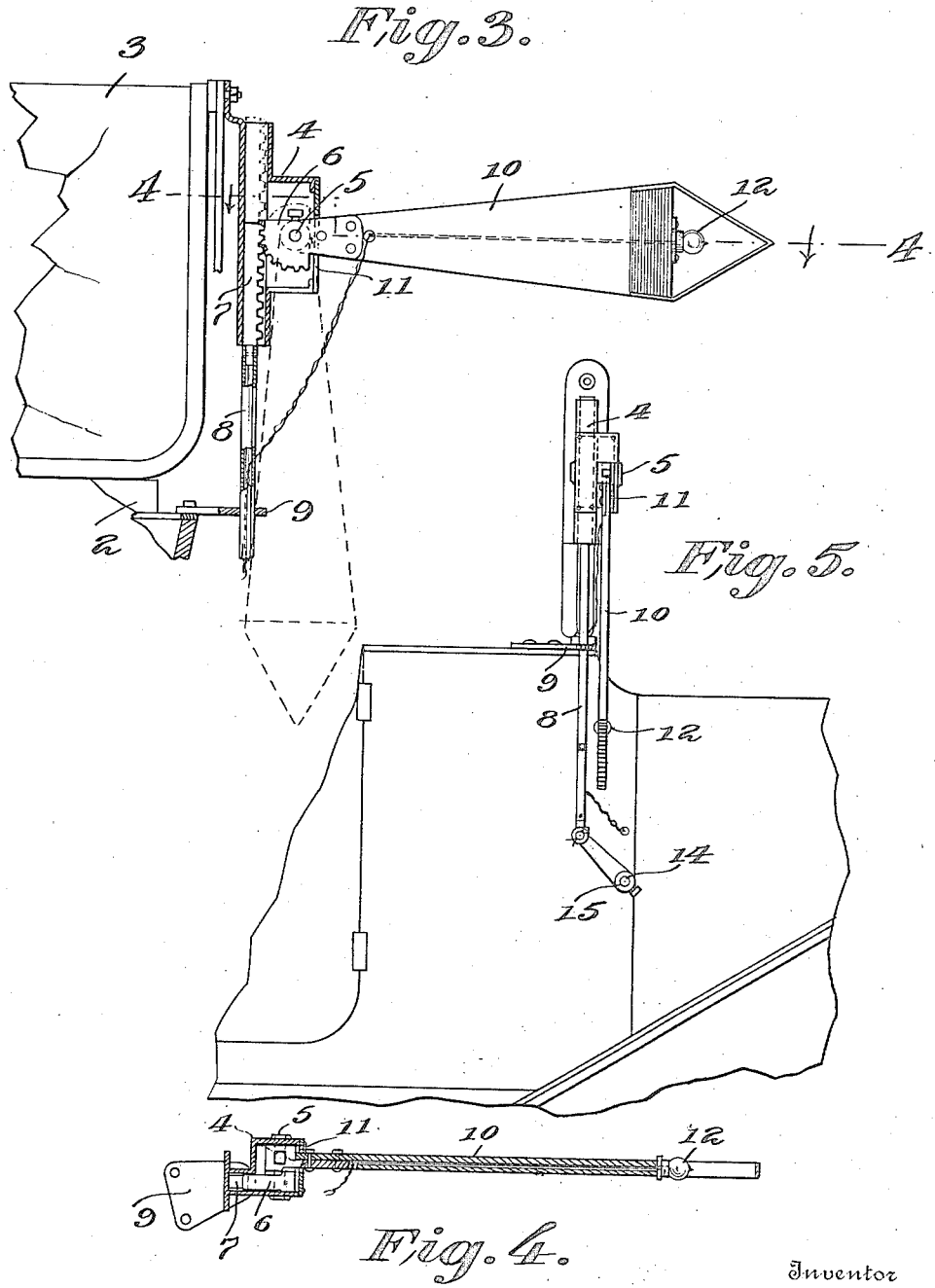

UNITED STATES PATENT OFFICE.

ERVINE H. FRANCE, OF DETROIT, MICHIGAN.

DIRECTION-INDICATING APPARATUS FOR MOTOR-VEHICLES.

1,222,379. Specification of Letters Patent. Patented Apr. 10, 1917.

Application filed March 25, 1916. Serial No. 86,638.

*To all whom it may concern:*

Be it known that I, ERVINE H. FRANCE, a citizen of the United States, residing at Detroit, in the county of Wayne and State of Michigan, have invented new and useful Improvements in Direction-Indicating Apparatus for Motor-Vehicles, of which the following is a specification.

This invention relates to improvements in direction indicating apparatus for motor vehicles and has particular application to manually controlled direction indicating apparatus.

In carrying out the present invention, it is my purpose to provide direction indicating apparatus for motor vehicles which will embody signal blades arranged at the opposite sides of the vehicle and so disposed as to be within the vision of operators of other vehicles and pedestrians both at the front and rear of the particular vehicle equipped, and wherein the signal blades may be operated independently of each other by foot pedals arranged upon the footboard within convenient reach of the driver.

It is also my purpose to provide apparatus of the type set forth wherein the signal blades may be automatically restored to normal position succeeding the operation thereof to signaling position, and wherein such blades may be locked in signaling position when such is desired.

With the above and other objects in view, the invention consists in the construction, combination and arrangement of parts hereinafter set forth in and falling within the scope of the claims.

In the accompanying drawings:

Figure 1 is a fragmentary cross sectional view through a motor vehicle equipped with signaling apparatus constructed in accordance with my present invention, the foot pedals and certain of the connections between said pedals and the blades on the footboard being shown in perspective.

Fig. 2 is an enlarged fragmentary cross sectional view through the footboard and pedals thereon.

Fig. 3 is an enlarged vertical sectional view through the casing inclosing the connections for one of the signal blades.

Fig. 4 is a horizontal sectional view through the same.

Fig. 5 is a fragmentary side elevation of the vehicle showing the shaft connections for the signal.

Referring now to the drawings in detail, 1 designates the footboard of a motor vehicle, while 2 indicates the dashboard and 3 the wind shield.

My improved signaling apparatus embodies casings 4, 4 arranged upon the opposite sides of the vehicle, and, in the present instance, these casings are connected to the opposite edges of the wind shield and extending across each casing 4 is a pin 5 upon which is rotatably mounted a segmental gear 6 meshing with a vertical rack bar 7 connected to the upper end of a vertical rod 8 working through an opening in the lower end of the casing 4 and slidably mounted within a bearing 9 secured to the adjacent edge of the dashboard, the lower end of the shaft 8 terminating in juxtaposition to the footboard 1, as clearly illustrated in Figs. 1 and 5 of the drawings. Detachably connected to the segmental gear 6 in each casing 4 is a signal blade 10 working within a slot 11 formed in the casing and capable of swinging movement from vertical position to horizontal or signaling position and normally disposed in vertical or inactive position. Any suitable form of connection may be established between the signal blade and the segmental gear so that the blade may be renewed whenever the same has become worn or broken.

In the present instance, the outer end of each blade 10 is equipped with an electric lamp 12 disposed within an aperture formed in the blade so that the lamp may be seen from the front and rear of the vehicle. These lamps are preferably, although not necessarily, connected in circuit with the magneto of the motor vehicle so that the same may be illuminated while the vehicle is in motion.

Arranged across the footboard 1 of the vehicle and rotatably mounted within supporting brackets 13 is a shaft 14 embodying sections 15, 15 placed end to end and having the outer ends thereof connected to the lower extremities of the respective rods 8 so that when the sections of the shaft are rotated in one direction motion will be transmitted through the rods 8, rack bars 7, and segmental gears 6 to the signal blades 10 to swing such blades to active or signaling position, while when the direction of rotation of the sections of the shaft 14 is reversed, the blades will be lowered or swung to inactive position. Secured to each section of the shaft 14 is an arm 16 connected by means of a restoring spring 17 with the footboard 1 and these springs 17 act to hold the respective sections of the shaft normally in non-signaling position so that the signal blades will be held inactive.

Disposed in front of the shaft 14 at the meeting ends of the sections of such shaft is a pivot rod 19 upon which are pivoted pedal levers 20, 20 projecting toward the foot of the driver and formed, adjacent to the free ends thereof, with downwardly projecting arms 21 respectively. Pivotally connected to the lower end of each arm 21 and projecting toward the shaft 14 is a connecting link 22 and the rear ends of the connecting links 22 are pivotally secured to depending arms 23 fastened to the respective sections 15, 15 of the shaft 14. In the downward movement of the pedals 20 motion is transmitted through the arms 21, links 22 and arms 23 to the respective sections of the shaft 14 with the effect to rotate such sections to throw the signal blades to signaling position. These pedals may be operated either simultaneously or singly and are disposed in juxtaposition to each other so that they may be bridged by the foot of the driver when it is desired to throw both signal blades to signaling position.

Suitable means is provided for locking the pedals in depressed position when desired and, in the present instance, this locking means comprises bars 24, each having one end pivotally connected to one of the arms 21 at the connection between such arm and the link 22, and the remaining end portion disposed beneath the shaft 14. The upper edges of the arms 24 are formed with depressions 25 adapted to receive the respective sections 15 of the shaft 14 and pivoted to the arms 24 respectively and projecting upwardly therefrom through openings 26 in the pedals 20 are rods 27, while connected to each rod 24 is one end of a coiled retractile spring 28, the remaining end of the spring being secured to the pedal 20.

As long as the pedals are in normal position, the upper edges of the rods 24 adjacent to the free ends thereof bear against the respective sections of the shaft 14 and the depressions 25 are arranged between such shaft and the pedals. When, however, the pedals are depressed the rods 24 slide with the links 22 and when the pedals reach their lowest point the notches 25 engage the respective sections of the shaft with the effect to lock the pedals down against the action of the springs 17. To release the pedals the free ends of the rods 27 are depressed by the foot, thereby disengaging the notched portions of the rods 24 from the respective sections of the shaft 14 and the pedals and rods 27 are let up gradually. By placing the foot on the pedals so as to engage the rods 27 simultaneously with the engagement of the pedals by the foot, the pedals may be lowered and elevated without locking.

In the use of the signals, the signal blade at the right side of the vehicle is thrown outwardly when it is desired to turn to the right the signal blade at the left hand side of the vehicle actuated to the signal position when about to turn to the left and when the operator of the vehicle is about to stop the latter, both blades may be thrown to signaling position. The signal blades are so arranged as to be clearly visible from the front and rear of the machine so that pedestrians and the operators of other vehicles in the vicinity of the vehicle equipped with the direction indicating apparatus will be warned of the direction in which the driver of the vehicle is about to turn his vehicle.

While I have herein shown and described one preferred form of my invention by way of illustration, I wish it to be understood that I do not limit or confine myself to the precise details of construction herein described and delineated, as modification and variation may be made within the scope of the claims and without departing from the spirit of the invention.

I claim:

1. In a signal apparatus of the class described, a signal blade mounted for swinging movement, a shaft in operable relation with said blade, a pivotally mounted pedal, an arm mounted on said shaft, a link connection between said pedal and said arm, a bar pivoted on said pedal and adapted to bear against said shaft and having a depression engageable with said shaft when said pedal is depressed for locking the mechanism in signaling position, a spring connected to said bar and said pedal whereby said bar is held against said shaft, a second spring adapted to hold the mechanism in its non-signaling position, and a rod pivotally mounted on said bar and extending upwardly through a hole in said pedal.

2. In a signaling apparatus of the class described, a signal blade mounted for swinging movement, a segment gear mounted thereon, a rack mounted for movement in a slide and engaging said segment gear, a rod affixed to said gear, a shaft, an arm mounted on said shaft and having its outer end pivotally connected to said rod, a pivotally mounted pedal, a second arm mounted on said shaft, a link connection between said pedal and said second arm, a bar pivoted on said pedal and adapted to bear against said shaft and having a depression engageable with said shaft when said pedal is depressed for locking the mechanism in signaling position, a spring connected to said bar and said pedal whereby said bar is held against said shaft, a second spring adapted to hold the mechanism in a non-signaling position, and a rod pivotally mounted on said bar and extending upwardly through a hole in said pedal.

In testimony whereof I affix my signature in presence of two witnesses.

ERVINE H. FRANCE.

Witnesses:
HUGO DENHARDT,
WM. DANIEL.